United States Patent [19]

Kress

[11] Patent Number: 5,134,829
[45] Date of Patent: Aug. 4, 1992

[54] CLIP FOR MOUNTING MOLDING

[76] Inventor: Ronald D. Kress, 1590 Shore Club Dr., St. Clair Shores, Mich. 48080

[21] Appl. No.: 678,836

[22] Filed: Apr. 2, 1991

[51] Int. Cl.⁵ .................... E04F 19/02; B32B 7/08
[52] U.S. Cl. .................................................. 52/718.1
[58] Field of Search .................. 52/716, 717.1, 718.1, 52/420

[56] References Cited

U.S. PATENT DOCUMENTS

| | | | |
|---|---|---|---|
| 2,839,126 | 6/1958 | O'Neill | 160/392 |
| 3,606,431 | 9/1971 | Kunevicius | 52/718.1 |
| 3,703,747 | 11/1972 | Hamman | 52/717.1 |
| 3,916,055 | 10/1975 | Wagner | 52/718.1 |
| 4,709,525 | 12/1987 | Adell | 52/718.1 |
| 4,869,937 | 9/1989 | Nagano et al. | 52/716 |
| 4,878,273 | 11/1989 | West et al. | 52/717.1 |

FOREIGN PATENT DOCUMENTS 452375  8/1936  United Kingdom .................. 52/716

Primary Examiner—James L. Ridgill, Jr.
Attorney, Agent, or Firm—Dykema Gossett

[57] ABSTRACT

A method and apparatus for securing moldings to vehicle bodies is disclosed. The molding preferably slidably receives clips at spaced locations along its length, wherein the clips have adhesive at their rear face. A desired amount of adhesive is selected for the particular molding, and spacing between the clips along the length of the molding is determined to achieve a desired adhesive area. In preferred embodiments of the present invention, the clip is configured such that it is slidably received within channels on the molding, and has a unique structure which provides efficient amounts of material of the molding to the vehicle body.

7 Claims, 2 Drawing Sheets

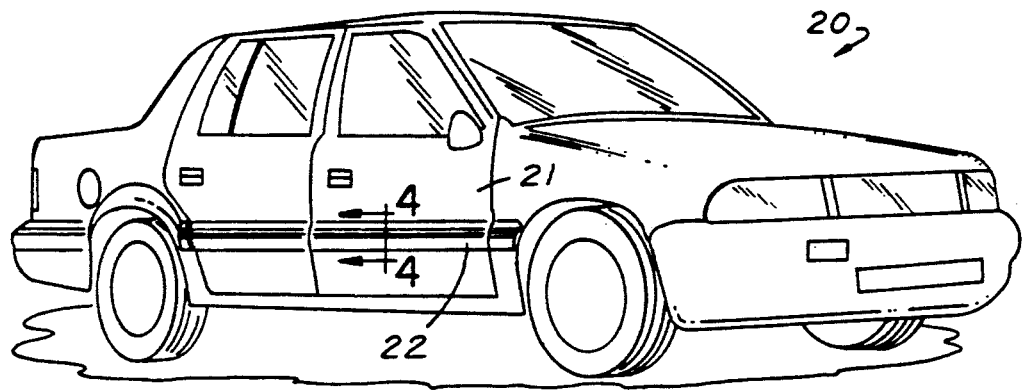
FIG. 1
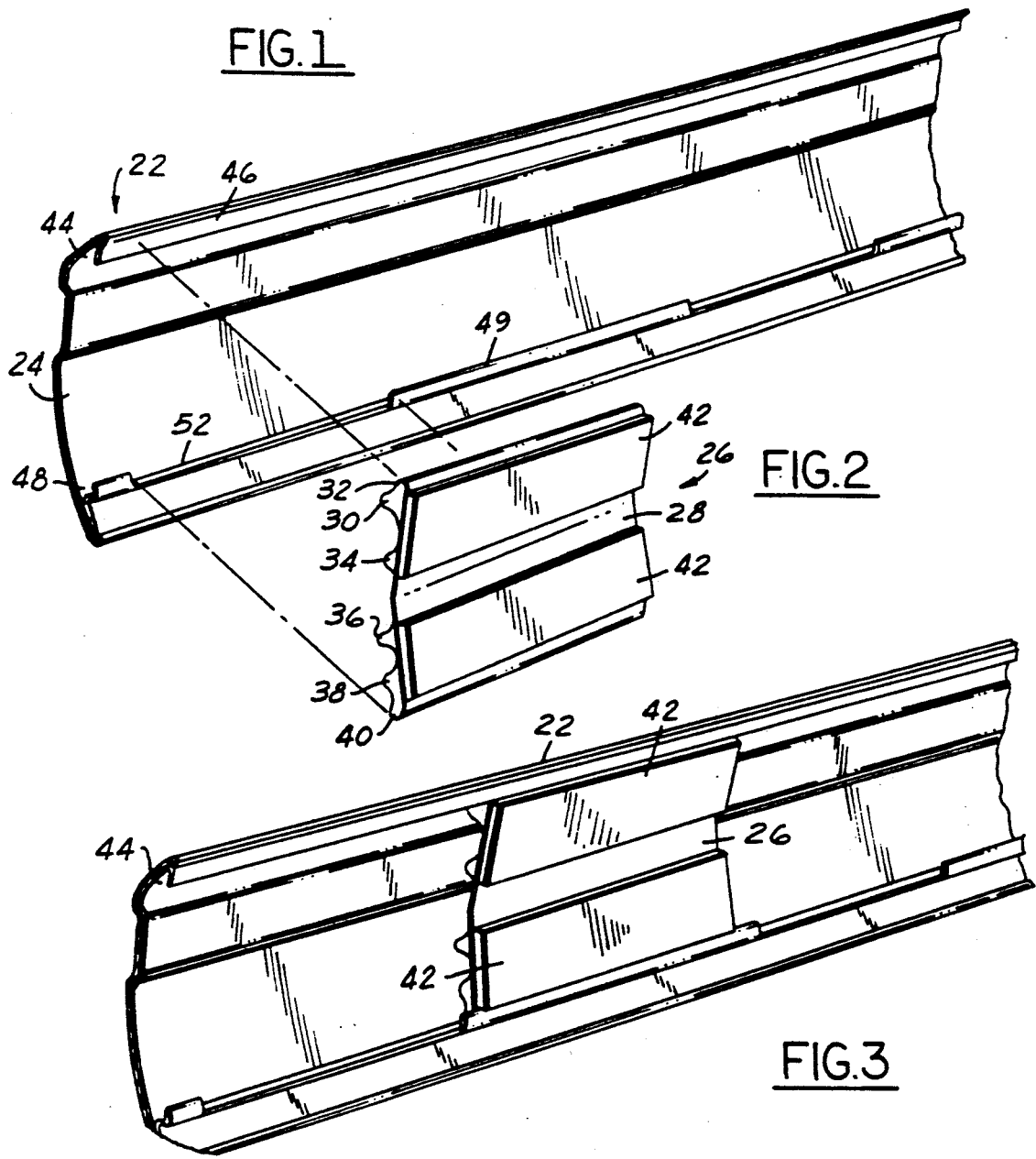
FIG. 2
FIG. 3

CLIP FOR MOUNTING MOLDING

BACKGROUND OF THE INVENTION

This application in general relates to a clip which allows a vehicle molding to be mounted to a vehicle body quickly, efficiently and inexpensively.

Moldings are now mounted to vehicle bodies a number of ways. The moldings may be attached to the vehicle body with common fastening elements such as a plug inserted into a hole in the body. An example of this type of mount are so-called weld studs which attach clips to the body for securing the molding. This is somewhat undesirable since it is relatively expensive and requires a hole to be formed in the vehicle body.

Adhesive strips has also been utilized on the back of moldings to secure the molding to the vehicle body. These strips have typically included adhesive extending for the entire length of the molding member. This is somewhat undesirable since it requires the molding to have a proper surface to receive the adhesive.

It is an object of the present invention to disclose a method and structure for securing a molding to a vehicle body that is relatively easy, efficient and inexpensive to utilize.

SUMMARY OF THE INVENTION

In a disclosed embodiment of the present invention, clips are mounted at spaced locations on a rear face of a molding. The term "molding" as used in this application refers to any member attached to a body such as a trim, cladding or even functional members such as handles. Further, this invention has benefits in attaching a member to non-vehicle bodies. The clips have adhesive rear faces which are affixed to the vehicle body and secure the molding to the vehicle body. In a preferred embodiment, the clips are received in a channel on the rear face of the molding and are spaced at selected locations. The channel may have entry openings at spaced locations such that the clip can be inserted into the molding and said to a desired position within the channel. As an alternative, the clip may be installed before ends of the molding that close the channels are installed, or the clip corners may be cut on angles and twisted into the channel.

As is known in the art, a roller member may be passed along the length of the molding and causes the adhesive to be secured to the vehicle body, or "wet out". The present invention achieves a high percentage of wet out adhesive due to its unique structure. As an alternative, the inventive clip allows application of force at the clip location.

In a preferred embodiment of the present invention, the clip member includes adhesive surfaces placed on one face of a metal substrate with plastic hills formed on the opposed face of the substrate. The metal substrate is preferably shaped to correspond to the contour of the vehicle body at the location the molding is attached. In that way, the metal substrate closely overlies the vehicle body, allowing a high degree of adhesive wet out.

The outermost plastic hills have outer faces curved to conform to the inner structure of the channel such that the clip is securely retained within the channel. The hills may have crushable fins at positions adjacent the inner periphery of the molding. The hills and fins provide a bearing surface to transfer force from the roller to the adhesive. It is preferred that the hills and fins are normally spaced from the molding rear face.

The optional crushable fins provide a margin of error for the bearing surface. It is desirable that a roller force the molding rear face against an adequate bearing surface. Since the amount of movement of the rear face of the molding is at least somewhat unpredictable, the crushable fins provide a margin of error. Should the roller move the molding rearwardly less than is expected, the molding still contact the fins and the force will be transferred to the adhesive. On the other hand, should the roller move the rear face of the molding a greater amount than would be expected, the fins are crushed and the force is transferred through the body of the hill. In this way, the fins provide a margin of error ensuring that the force from the roller is effectively transferred to the adhesive. The structure of the fins is such that they do not break off of the hills, but that a fracture line is formed and the fins are retained on the hills. This prevents rattling and undesirable noise.

In a preferred embodiment of the present invention, the number of clips per unit length of molding are determined based upon the weight of the molding. A particular amount of adhesive area is desirable for each pound of molding.

These and other objects and features of the present invention can be understood from the following specification and drawings.

BRIEF DESCRIPTION OF THE DRAWINGS

FIG. 1 is a largely schematic view of a vehicle.

FIG. 2 is a rear assembly view showing a molding and clip member according to the present invention.

FIG. 3 is an assembled view of the molding and clip member shown in FIG. 2.

DETAILED DESCRIPTION OF A PREFERRED EMBODIMENT

Figure 4:
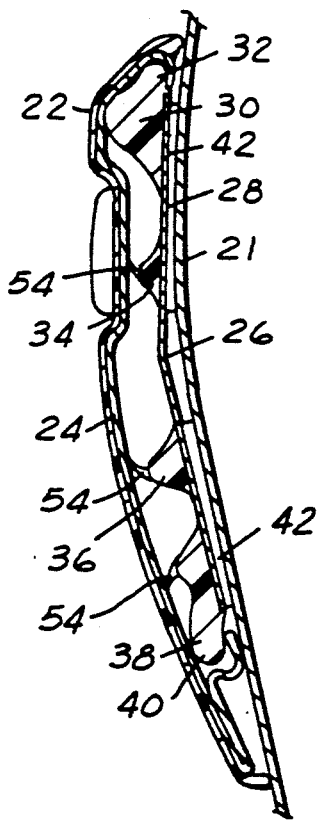
FIG. 4 is a cross-sectional view through the molding illustrated in FIG. 3.

Vehicle 20 includes body outer side 21 which may include molding 22. A structure for attaching molding 22 to body 21 is disclosed below.

FIG. 2 illustrates molding 22 having an inner or rear face 24 which receives clip 26. Clip 26 includes metal substrate 28 having a hill 30 at one end which has an end curve 32. Hills 34 and 36 are at central locations on substrate 28, while hill 38 is at an opposed end of clip 26 and has an end curve 40. Adhesive faces 42 are formed on a rear face of clip 26.

Clip 26 is received within channel 44, defined by flange 46 on molding rear face 24, and channel 48 defined by flange 49 at the opposed end. End curves 32 and 40 of hills 30 and 38, respectively, may be shaped such that they basically conform to the inner periphery of channels 44 and 48, respectively.

Openings 52 extend for a greater length than the length of clip 26. Thus, clip 26 may be aligned with an opening 52 and end periphery 32 inserted within channel 44. Clip 26 may then be slid within channel 44 until end periphery 40 moves into channel 48. Clip 26 is now secured on molding 22 between channels 44 and 48.

As shown in FIG. 3, clip 26 is received between channels 44 and 48. Adhesive faces 42 face rearwardly to attach molding 22 to a vehicle body.

As shown in FIG. 4, hills 30, 34, 36 and 38 all extend forwardly from substrate 28. Preferably there is a slight clearance between the rear face 24 of molding 22 and the hills. Adhesive surfaces 42 are in contact with body side 21 to secure molding 22 to the vehicle. Substrate 28 is preferably shaped to approximate the shape of the body side 21. End curves 32 and 40 are received at the inner periphery of channels 44 and 48, respectively. Hills 34, 36, and 38 may optionally have crushable fins 54. It is possible to extend substrate 28 such that it is received in the channels.

Separate adhesive 42 portions are associated with the two ends of clip 26. Hill 30 and hill 34 are associated with the top and inner ends of the uppermost adhesive strip 42, while hills 38 and 36 are respectively associated with the bottom and inner end of the bottommost adhesive strip 42. The pair of hills associated with each of the taped strips ensures proper transfer of the force to each of the taped strips and a high degree of wetting on the surface area of the tape.

Figure 5:
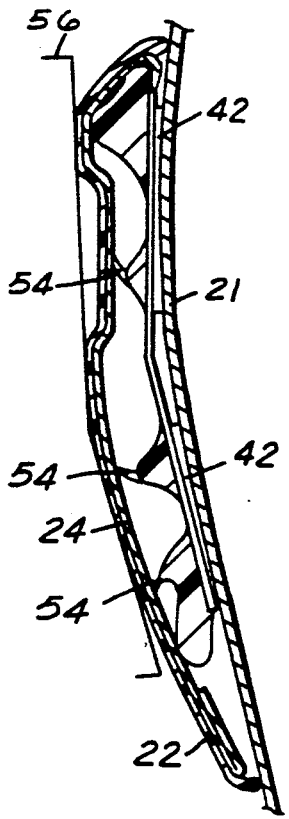
FIG. 5 is a view similar to FIG. 4, but showing the molding being secured to the vehicle.

As shown in FIG. 5, a roller element 56 is rolled along molding 22. As roller 56 rolls along the molding a force is transferred through the rear face 24 of molding 22 and through the hills such that adhesive strips 42 wet on body side 21, securing molding 22 to the vehicle. Fins 54 may fracture from the remainder of their respective hills. The fins 54 provide a margin of error ensuring that roller 56 will have an effective bearing surface to transfer its force to adhesive strips 42. Should roller 56 not deform the rear face 24 as great an amount as expected, fins 54 still contact the inner face of the molding and transfer sufficient force. On the other hand, should roller 56 move the rear face 24 rearwardly more than would have been expected, fins 54 crush and the force is transmitted to the body of the hills. Further, this unique structure ensures proper transfer of force through irregular surfaces along the vehicle or molding bodies.

Figure 6:
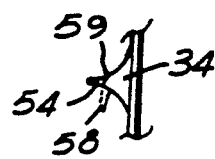
FIG. 6 is an enlarged view of a portion of the clip according to the present invention.

As shown in FIG. 6, hill 34 includes crushable fin 54 which has been crushed to a fractured position 58 shown in phantom. Fracture line 59 continues to secure fin 54 to the remainder of hill 34. Fin 54 does not break away from the remainder of the hill, such that it could rattle and cause undesirable noise.

Figure 7:
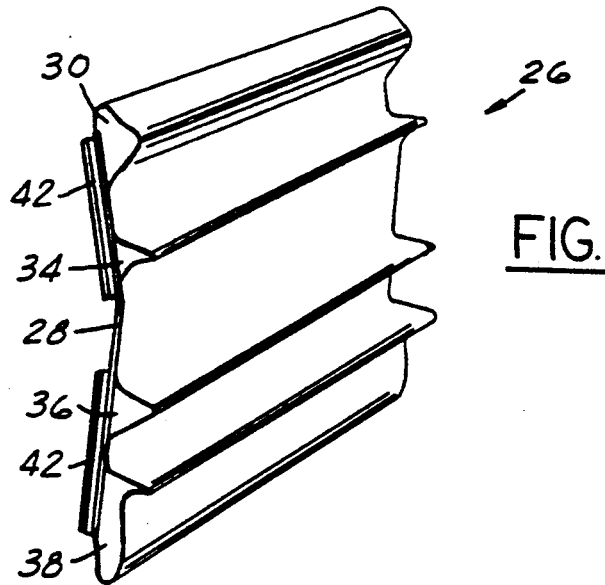
FIG. 7 is a perspective view of the clip according to the present invention.

FIG. 7 shows a perspective view of clip 26 including metal substrate 28, hills 30, 34, 36 and 38 and adhesive strips 42. Crushable fins 54 are also shown.

In selecting the amount of adhesive per unit length of molding one considers the weight of the molding to ensure that adequate adhesive is utilized. The spacing between clips, and the length of the clips are thus selected. In one example, a forty-nine inch molding has seven four-inch clip members with three and one-half inch gaps between the clips. In another example, a thirty-eight inch molding has five four-inch clips with four and one-half inch clearance between the clips. In a third example, a twenty-five inch molding has three four-inch clips with six and one-half gaps between clip members.

In preferred embodiments, the metal substrate is aluminum. Aluminum is preferred since the tape utilized has better adhesion to aluminum surfaces. The tape is preferably a double faced tape available from 3M Company. Such tapes have been utilized to secure moldings in the past, although as noted above, they were typically formed along the entire length of the molding. The plastic hills are preferably PVC, although other plastics could be utilized. Further, the hills could be hollow.

The clip is preferably formed by forming the metal substrate from a form block or roll formed metal. The plastic hills are then extruded or injection molded onto the metal, cooled and dried. The double faced tape is then preferably rolled onto the opposed face of the metal substrate, completing the clip. Individual clips are cut to a desired length from the web of clip material. Preferably the above processes are formed in line.

Although preferred embodiments of the present invention have been disclosed, a worker of ordinary skill in the art would recognize that certain modifications would come within the scope of this invention, for that reason, the following claims should be studied in order to determine the true scope and content of the present invention.

I claim:

1. The combination of a molding and a clip for securing the molding comprising:
    a molding having a front face and a rear face and extending for a first length; and
    a clip carried on said rear face of said molding, said clip extending for a length less than said first length, said clip having an adhesive face facing rearwardly of said molding, a metal substrate positioned between said molding and said adhesive face, and a plurality of plastic bearing surfaces extending from said metal substrate in a direction towards said molding.

2. The combination as recited in claim 1, wherein said bearing surfaces having crushable fins which extend towards said rear face of said molding, said crushable fins being such that they do not break away from the remainder of said bearing surface which crushed, but instead are fractured and remain attached to said bearing surface.

3. The combination as recited in claim 1, wherein there are a pair of spaced adhesive strips, and bearing surfaces associated with each of said strips.

4. The combination as recited in claim 1, wherein at least some of said plastic bearing surfaces extend to a position closely spaced from said molding, and said molding is resiliently deformable such that when a force is applied to said front face of said molding, it deforms rearwardly to contact said closely spaced plastic bearing surfaces.

5. The combination as recited in claim 1, wherein said metal substrate is aluminum.

6. The combination as recited in claim 1, wherein said molding has a pair of opposed channels and said clip is received between said channels.

7. The combination as recited in claim 6, wherein said channels have spaced openings, such that said clip may be inserted into said channels at various locations along said first length.

* * * * *